Patented Dec. 30, 1952

2,623,892

UNITED STATES PATENT OFFICE 2,623,892

TRI-ALKYL TIN MONO-ALKOXIDES

Desmond Cleverdon, Tadworth, England, Johann Josef Peter Staudinger, Penmark, near Barry, Wales, and Donald Faulkner, Epsom, and John Noel Milne, Epsom Downs, England, assignors to The Distillers Company Limited, Edinburgh, Scotland, a British company No Drawing. Original application September 5, 1950, Serial No. 183,288. Divided and this application April 19, 1951, Serial No. 221,952. In Great Britain September 14, 1949

4 Claims. (Cl. 260—429)

The present application is a division of copending application, Serial No. 183,288, filed September 5, 1950, for Stabilisation of Vinyl Chloride Polymers.

This invention relates to stabilisers particularly adapted for the production of stabilised polyvinyl chloride compositions.

The thermal decomposition of polyvinyl chloride is accompanied by the evolution of hydrogen chloride and it is believed that the free hydrogen chloride present in the polymer catalyses the further decomposition thereof. Various stabilisers have been proposed for addition to polyvinyl chloride to minimise its decomposition at higher temperatures; metallic soaps have been used for this purpose, particularly lead stearate, the action of the stabilisers being that they combine with the free hydrogen chloride in the polymer to generate the metal chloride and the fatty acid.

Lead stearate is a very effective compound as a stabiliser but suffers from the disadvantage that the stearic acid as well as the lead chloride produced as a result of the action of the hydrogen chloride is not soluble in the polyvinyl chloride composition, and, therefore, polyvinyl chloride stabilised with lead stearate is always opaque.

It has been proposed to take advantage of the fact that it is possible to confer solubility upon the metal halide formed from the stabiliser by attaching to the metal radical of the stabiliser a sufficiently bulky alkyl radical. One specific example of such a stabiliser is di-butyl tin di-laurate. This compound, on reaction with hydrogen chloride, decomposes into di-butyl tin di-chloride and lauric acid; this compound has the advantage that the organo-metallic halide is soluble in the polymer but has the disadvantage that the lauric acid is not compatible with the polymer and consequently the use of di-butyl tin di-laurate in concentrations from slightly from below 1% by weight upwards gives rise to a cloudy polymer composition; di-butyl tin di-laurate is, of course, a satisfactory stabiliser where it is only required to be used in very small concentrations or where the transparency of the polyvinyl chloride is of minor importance.

Whereas the di-alkyl metal carboxylates have overcome the defect attached to the use of lead carboxylates, i. e. the precipitation of lead chloride, they still suffer from the defect of depositing the carboxylic acid and consequently it is an object of the present invention to provide stabilisers for the stabilisation of polymers and copolymers of vinyl chloride and compositions containing them which will not yield opaque or cloudy products and to this end the invention contemplates the use of stabilisers which, on reaction with hydrogen chloride, split into products which are soluble in the said polymers, copolymers or compositions. It is a further object of our invention to provide stabilisers which yield stabilised compositions comprising polymers and copolymers of vinyl chloride of improved electrical properties.

The present invention makes it possible to achieve the stabilisation of a polymer or copolymer of vinyl chloride, or compositions thereof, against thermal decomposition, by adding to said polymer, copolymer or composition, a tri-alkyl tin mono-alkoxy compound in which the alkyl radicals are such that the corresponding tri-alkyl tin chloride is soluble in the said polymer or copolymer or in the composition; preferably the alkyl radicals each contain not less than four carbon atoms and the alkyl radical of the alkoxy group contains from one to eight carbon atoms.

It has been found that tri-butyl tin mono-alkoxides are particularly satisfactory stabilisers and result in the production of transparent products. The stabiliser of our invention may be added prior to, during or after polymerisation, but preferably after polymerisation.

The action of the organo-tin compounds of the present invention is probably to undergo double decomposition on reaction with hydrogen chloride to produce on the one hand the tri-alkyl tin chloride and on the other hand the aliphatic alcohol corresponding to the alkoxy radical. For example, tri-butyl tin mono-butoxide produces tri-butyl tin mono-chloride and normal butanol, both of which compounds are soluble in polyvinyl chloride and in polyvinyl chloride compositions and in copolymers of vinyl chloride and compositions thereof.

The tri-alkyl tin mono-alkoxides may be prepared by reacting a tri-alkyl tin mono-halide with an alkali metal alkoxide. This reaction may be carried out by adding the tri-alkyl tin halide to a solution of the alkali metal alkoxide in the corresponding alcohol, or the dry, powdered alkali metal alkoxide may be reacted with an ethereal solution of the tri-alkyl tin halide.

Thus, tri-butyl tin mono-butoxide may be made by adding tri-butyl tin chloride to a solution of sodium butoxide in butyl alcohol; sodium chloride is precipitated, and the tri-butyl tin butoxide may be recovered by distilling the filtered solution under reduced pressure. The required tri-alkyl tin mono-halide may be obtained by first forming the alkyl magnesium halide compound by the usual Grignard technique and reacting it with a solution of the correct proportion of the corresponding tetra-halide of tin. The product of such a reaction, however, is usually a mixture from which the pure tri-alkyl tin halide can be separated only with great difficulty, and the preparation of a pure tri-alkyl tin halide is preferably accomplished by heating a mixture of a tetra-alkyl tin and a tin tetra-halide in the proportions indicated by the equation $$3R_4Sn + SnX_4 \rightarrow 4R_3SnX$$

where R is an alkyl group and X is chlorine, bromine, or iodine.

Copolymers which may be stabilised by the method of the present invention include those of vinyl chloride with other compounds containing mono-ethylene linkages which are copolymerisable with vinyl-chloride. Such compounds include acrylonitrile; acrylic esters such as methylacrylate, ethylacrylate and the like; methacrylic esters such as methyl methacrylate, ethyl methacrylate and the like; esters of maleic acid and fumaric acid such as the di-methyl, di-ethyl, di-butyl, di-hexyl or di-benzyl esters; esters of itaconic acid and aconitic acid; vinyl esters such as vinyl acetate, vinyl chloracetate, vinyl methoxy butyrate and the like; esters of glycol mono-alkyl ethers such as ethylene glycol mono-alkyl ethers; and vinylidene chloride.

The following examples illustrate the present invention. Parts by weight bear the same relation to parts by volume as do grams to cubic centimeters.

*Example 1*

Tri-normal-butyl tin mono-butoxide was prepared by dissolving 9 parts by weight of clean sodium in 200 parts by weight of dry normal-butanol and a solution of 108 parts by weight of tri-butyl tin chloride in 100 parts by weight of dry normal-butanol was added rapidly to the still warm solution of sodium butoxide. The mixture was stirred for 1 hour at room temperature and for a further 40 minutes at reflux temperature, after which it was cooled to room temperature and allowed to stand for 16 hours. The precipitated sodium chloride was removed by centrifuging, the clear supernatant liquid decanted and the excess normal-butanol removed by warming under reduced pressure. Distillation of the residue under reduced pressure yielded 60 parts by weight of nearly pure tri-butyl tin mono-butoxide, boiling point 124–126° C./3 mm. mercury pressure and refractive index $n_D^{20}$ 1.4685.

100 parts by weight of a copolymer of 95 parts by weight of vinyl chloride and 5 parts by weight of ethyl maleate were mixed with 20 parts by weight of tri-cresyl phosphate, 100 parts by weight of di-butyl phthalate and 5 parts by weight of tri-butyl tin mono-butoxide. This mix was heated on rollers at 135° to 140° C. for 5 minutes and the compounded mass was taken off as thick sheet of 3 mm. thickness. This sheet was pressed for 3 minutes between polished plates at 150° C. and 0.3 ton per square inch pressure. The pressed sheet (2.5 mm. thick) was transparent to such an extent that when put over a newspaper, the print was clearly visible and distinguishable.

When preparing an identical composition but using 2.5 parts by weight of lead oxide in place of the 5 parts by weight of tri-butyl tin butoxide above referred to, the sheet of 2.5 mm. thickness is opaque to such an extent that newspaper print is not visible through the sheet.

*Example 2*

Tri-normal-butyl tin mono-butoxide was prepared by dissolving 6 parts by weight of clean sodium in 250 parts by weight of dry normal-butanol and a solution of 74 parts by weight of tri-butyl tin bromide in 180 parts by weight of dry normal-butanol was added dropwise to the still warm solution of sodium butoxide, the addition requiring 15 minutes. Stirring was continued for a further 20 minutes at room temperature, after which the mixture was allowed to stand for 16 hours. The precipiated sodium bromide was removed by centrifuging, the clear supernatant liquid decanted and the excess normal-butanol removed by warming under reduced pressure. Distillation of the residue under reduced pressure yielded 30 parts by weight of nearly pure tri-butyl tin mono-butoxide, boiling point 124–128° C./3 mm. mercury pressure and refractive index $n_D^{20}$ 1.4688.

100 grams of polyvinyl chloride was mixed with 50 grams of di-octyl phthalate, 3 grams of tributyl tin mono-butoxide and 0.125 gram of stearic acid. This mix was milled for 5 minutes at 140° C. and from the sheet formed, a specimen 0.15 cm. thick was moulded at 150° C. This was cut into seven pieces 1.5 cm. square and six of these were placed in an air oven at 175° C. Specimens were removed from the oven after 5, 10, 15, 30, 45 and 60 minutes and compared with the unheated sample and with similarly prepared samples in which the tributyl tin mono-butoxide was omitted.

The samples containing tributyl tin mono-butoxide remained transparent and varied in colour from colourless to pale orange brown, depending on the time of heating.

The samples containing no stabilizer varied in colour from pale yellow to dark brown or black.

In each case the sample containing no stabiliser was inferior in colour and transparency to corresponding sample containing tributyl tin tributoxide.

*Example 3*

Tri-normal-octyl tin mono-methoxide was prepared by dissolving 3 parts by weight of clean sodium in 150 parts by weight of dry methanol and 41 parts by weight of tri-normal-octyl tin chloride were added to the still warm solution of sodium methoxide. After stirring for 5½ hours at room temperature, the mixture was allowed to stand for 3 days, the product separating out as a methanol insoluble liquid layer. The precipitated sodium chloride was separated by filtration and the excess methanol removed by warming under reduced pressure. The pasty residue was shaken with 150 parts by weight of water and the insoluble oil was extracted with light petroleum. The petroleum extract was washed with water and dried over anhydrous magnesium sulphate. Removal of the solvent left the crude tri-normal-octyl tin mono-methoxide as a colourless, odourless liquid insoluble in water and alcohol. The crude product was distilled with slight decomposition under a pressure of 3 mm. mercury pressure, yielding 15 parts of slightly impure tri-normal-octyl tin mono-methoxide, refractive index $n_D^{20}$ 1.4781.

A mix, prepared, as in the previous example, in which the tributyl tin mono-butoxide was replaced by the same amount of tri-normal-octyl tin mono-methoxide, was subjected to precisely similar treatment.

In each case the samples obtained were similar to the corresponding samples stabilized with tri-butyl tin mono-butoxide and superior to corresponding samples containing no stabiliser.

*Example 4*

A tube was filled with a mixture consisting of 2 parts by weight of polyvinyl chloride and 10 parts by volume of di-butyl phthalate, and 0.1 part by weight of tri-butyl tin mono-methoxide was then added.

The tube was immersed in an oil bath and maintained at a temperature of 180°–185° C. for 15 minutes; it was then removed from the oil bath, cooled and the contents examined for colour and appearance. The contents were perfectly transparent and exhibited a pale yellow colour indicating only a very slight degree of decomposition.

The polyvinyl chloride subjected to test in this example was of a comparatively poor quality, i. e. possessed a certain colour and was not water white and the colour would have been less had a purer sample of polyvinyl chloride been used for the tests.

The absence of opacity characterises the product of this example as essentially superior to the wholly opaque product which would result from the use of, for instance, lead stearate in lieu of the tri-butyl tin methoxide.

*Example 5*

A mix was prepared as follows:

(a) 100 parts by weight of polyvinyl chloride
50 parts by weight of methyl glycol phthalate
3.5 parts by weight of tri-butyl tin mono-butoxide This mix was compounded on steam heated rollers at 135° C. for 8 minutes. By this time the mix was fully homogenised and could be rolled out into a thin sheet. The resultant sheet was essentially transparent.

A corresponding sheet, made with replacement of the tri-butyl tin mono-butoxide by tin stearate, is opaque.

Having thus disclosed the invention, what is claimed is:

1. A tri-alkyl tin mono-alkoxide, wherein the alkyl radicals of the tri-alkyl group each contains not less than 4 carbon atoms and the alkyl radical of the alkoxy group contains from 1 to 8 carbon atoms.
2. Tri-butyl tin mono-methoxide.
3. Tri-octyl tin mono-methoxide.
4. Tri-butyl tin mono-butoxide.

DESMOND CLEVERDON.
JOHANN JOSEF PETER STAUDINGER.
DONALD FAULKNER.
JOHN NOEL MILNE.

REFERENCES CITED

The following references are of record in the file of this patent:

UNITED STATES PATENTS

| Number | Name | Date |
| --- | --- | --- |
| 1,489,518 | Burt | Nov. 29, 1949 |

OTHER REFERENCES

Krause et al., Die Chemie Der Metal Organischem Verbindungen, page 328, Edwards Brothers Inc., Ann Arbor, Michigan, 1943.